T. A. Risher,
Corn Harvester.
No. 19716. Patented Mar. 23, 1858.
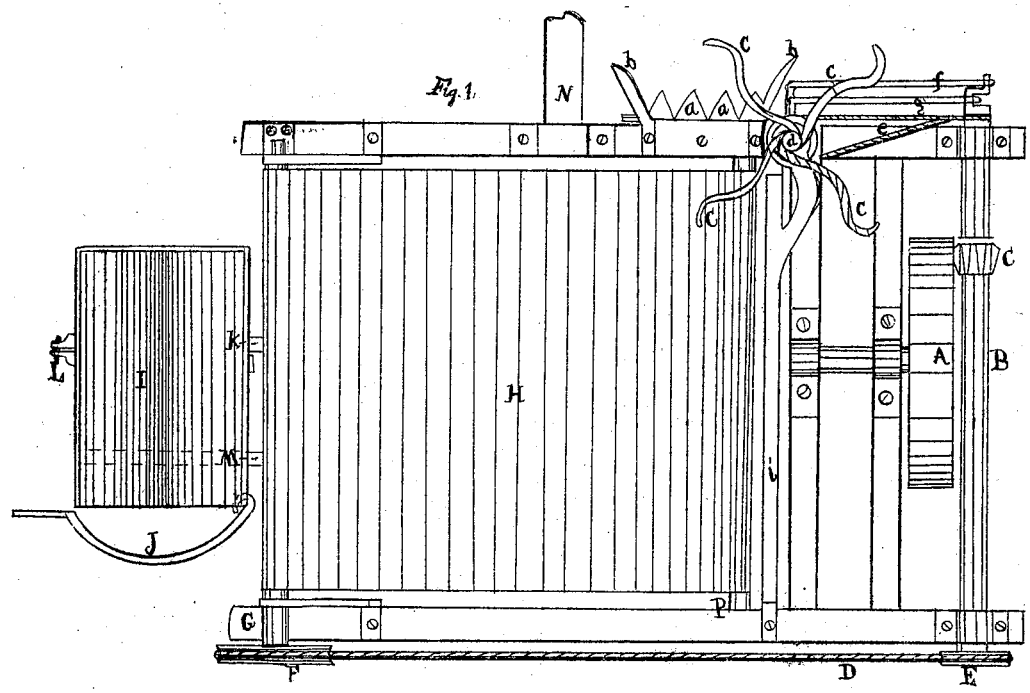
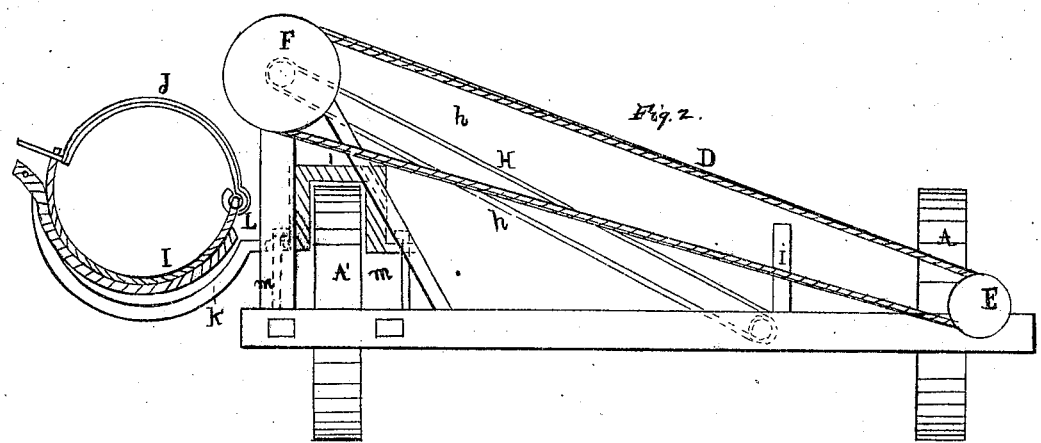
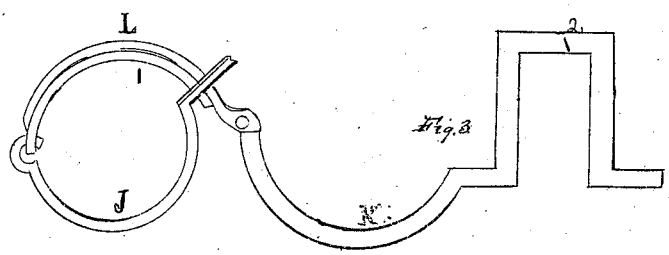

UNITED STATES PATENT OFFICE.

THOS. A. RISHER, OF CIRCLEVILLE, OHIO.

IMPROVEMENT IN CORN-HARVESTERS.

Specification forming part of Letters Patent No. 19,716, dated March 23, 1858.

*To all whom it may concern:*

Be it known that I, THOMAS A. RISHER, of Circleville, Ohio, have invented certain new and useful Improvements in Corn-Harvesters; and I do hereby declare that the following is a full, clear, and exact description of the same, reference being had to the accompanying drawings, and to the letters of reference marked thereon.

The nature of my invention consists in the arrangement of the devices hereinafter mentioned for the purpose of shocking corn, as will be described.

In order that others skilled in the arts may construct and use my invention, I will proceed to describe its construction and operation.

In the accompanying drawings, making a part of this specification, Figure 1 represents a plan view of the machine. Fig. 2 is a back elevation. Fig. 3 is a view detached of the devices for receiving and shocking the corn.

In Fig. 1, A represents the driving-wheel of the machine. This wheel, being provided with cogs on its side, connects with the shaft B by means of the bevel-wheel C on shaft B, and imparts motion to it by means of said wheel C. B is the main driving-shaft of the machine, and, as will be seen, is provided at one end with a double crank and at the other with a pulley marked E. This pulley E connects with pulley F by means of band D and serves to convey motion to shaft G, and by this means to the endless belt which passes around shaft G. The double crank on the end of shaft B is connected, as will be seen, to the small pitmen *f* and *g*. Said pitmen, being attached to the cutter-bars of the machine, serve to drive them in different directions. *e* is a belt which passes over a pulley on shaft B and around the pulley marked *o* on shaft *d*. This belt *e* serves to drive the perpendicular shaft *d*. *c c c c* are arms attached to shaft *d*, and are for the purpose of drawing the corn into the knives. These arms have an inclined set, and draw in any stalks of the corn which may have fallen or been bent downward. *a a* are the cutters, which are operated by means of the small pitmen *f* and *g*. *b b* are guides on each side of the cutters for the purpose of guiding straggling stalks into the cutters. N is the tongue of the machine. H is an endless belt, which passes around shafts or rollers G and P. This belt is provided with pins, as seen in Fig. 2, for the purpose of conveying the corn from the position in which it falls to the concave shocker I. I is a concave into which the corn falls from the endless belt. K is a concave support upon which I rests. M is also a support. L is a strap secured to the back of concave I, said strap being pivoted or hinged to support K, as seen in this figure. J is a concave lever-clamp, which is secured to concave I, and is for the purpose of pressing the cornstalks when they fall into the concave and holding them in position until ready to drop them in shock form from the concave.

In Fig. 2, A is the driving-wheel of the machine. A' is one wheel on which the machine rests and moves. D is a band which connects the pulleys E and F, and by means of which motion is conveyed to the endless belt H. H is the endless belt for conveying the corn to the concave I after it has been cut. *h h* are pins on the endless belt H. *i* is a perpendicular guide against which the corn rests after being cut until carried away by the pins on the endless belt. One portion of the concave rest K is in the form seen at *l* in this figure, and has two bearings on different sides of the wheel A' in the uprights, marked *m m*. I is the concave shocker. L is the metal strap, secured to the back of it, and J is the concave lever-clamp, secured, as seen, to I.

Fig. 3 represents the shocker in position for dropping the corn from the machine in shock form.

In the operation of this machine, the horses being attached in front at the tongue N and the machine set in motion, wheel A, Figs. 1 and 2, gives motion to shaft B by means of bevel-wheel C, and shaft B, it will be seen, by means of its pulleys and cranks, gives motion to the endless belt, to the shaft *d*, with its gathering-arms *c c*, and to the two cutter-bars by means of the short pitmen *f* and *g*. The corn, being gathered into the cutters by the arms *c c c c*, is cut by the knives *a a* and falls back upon the endless belt and against the guide *i*. The belt being inclined and the guide being perpendicular, the corn falls against the guide and is kept in a straight position, to be carried away by the pins on the endless belt. The corn being carried up on the endless belt, and the concave shocker I being directly under the upper end of the belt, it falls into the shocker from the belt, and remains there until sufficient accumulates to form a shock. The machine is then stopped, and the clamp-lever J brought in the position seen in Fig. 2. By means of this lever the head of the shock is compressed and may be bound. When it is desired to deposit the shock upon the ground the rest K is made to assume the position seen in Fig. 3, the lever J holding the shock in the concave until it takes a perpendicular position with the butts down, ready for dropping. The lever is then loosened and the shock falls about a foot, and thus settles it firmly on the ground. The shocker is always high enough from the ground to admit of its swinging around clear of the stubble and to settle the shock well by its fall.

It will be seen that the shocker or the strap secured to the shocker is hinged to the rest K so as to admit of the shock swinging around behind and out of the way of the machine when it is to be deposited on the ground.

Having thus fully described my invention, what I claim as new, and desire to secure by Letters Patent, is—

The arrangement of the concave shocker I, clamp-lever J, and rest K with relation to cutters $a\,a$, inclined arms $c\,c\,c\,c$, belt H, and guide $i$, the whole being constructed and operated in the manner and for the purpose herein set forth.

T. A. RISHER.

Witnesses:
C. M. ALEXANDER,
T. H. ALEXANDER.